United States Patent [19]

Thomas

[11] 4,429,218
[45] Jan. 31, 1984

[54] SCANNING BEAM DETECTOR

[75] Inventor: Dale C. Thomas, Ontario, N.Y.

[73] Assignee: Xerox Corporation, Stamford, Conn.

[21] Appl. No.: 262,154

[22] Filed: May 11, 1981

[51] Int. Cl.³ .............................................. H01V 40/14
[52] U.S. Cl. ................................. 250/214 R; 250/236
[58] Field of Search ........................ 250/201, 234–236, 250/560, 214 R, 214 A; 358/293

[56] References Cited

U.S. PATENT DOCUMENTS

| | | | |
|---|---|---|---|
| 2,604,534 | 7/1952 | Graham | 178/6.8 |
| 3,922,485 | 11/1975 | Starkweather et al. | 350/7 |
| 4,025,796 | 5/1977 | Erdmann | 250/560 |
| 4,121,251 | 10/1978 | Arai | 358/208 |
| 4,142,105 | 2/1979 | Erdmann | 250/560 |
| 4,143,403 | 3/1979 | Ohnishi | 358/293 |
| 4,170,028 | 10/1979 | DeBenedictis et al. | 250/236 |
| 4,206,348 | 6/1980 | Davy et al. | 250/201 |
| 4,214,154 | 7/1980 | Sato | 250/235 |
| 4,214,157 | 7/1980 | Check, Jr. et al. | 250/236 |
| 4,243,294 | 1/1981 | Noguchi | 358/295 |

Primary Examiner—David C. Nelms
Attorney, Agent, or Firm—Robert A. Chittum; John B. Mason

[57] ABSTRACT

In a radiant energy beam scanning system, a detector, positioned at a predetermined position along the path scanned by the beam, for sensing the center position of the power distribution within the beam and generating a signal indicative thereof. When utilized in an information recording system, the detector is positioned adjacent the start position of the scan path so that the generated indicator signal provides a reference for system timing and synchronization. In such a recording environment, synchronization of the system relative to the center position of power distribution within the beam compensates for variations in beam power level and focus, assuring proper alignment of information recorded on consecutive scan lines. In a preferred form, a diode detector, partially masked in a cross-scan direction, is employed to provide an output signal when irradiated by the scanning beam. The detector output signal is amplified and filtered to provide a reference signal which represents the average total power of the beam. The reference signal is divided in half and supplied to a comparator for comparison with the detector output signal. As the beam crosses the edge of the mask, the detector output decreases rapidly towards zero. When this output signal reaches 50% of the average total power level, the comparator switches, creating the indicator signal.

12 Claims, 3 Drawing Figures

SCANNING BEAM DETECTOR

BACKGROUND OF THE INVENTION

The invention broadly relates to a radiant energy beam scanning system. More particularly, the invention concerns a method and means for generating timing and power level reference signals responsive to the detection of the center of the power distribution within the beam at a predetermined point along a scanned path.

In conventional light beam recording devices, an intensity modulated light beam (e.g. a laser) is repetitively scanned across the surface of a photosensitive medium to produce an imagewise rendition of the desired information. The cyclical scanning pattern is typically established with the use of a moving beam deflector, such as a rotating polygonal mirror or an oscillating galvanometer mirror.

For quality image resolution, the recorded characters are usually formed as composite images of individual picture elements generated on consecutive scan lines. To avoid blurred or deformed characters, these individual picture elements must be aligned, from scan to scan, in the vertical, or cross-scan, direction (i.e., orthogonal to the direction of scan). Various forms of detectors have been proposed heretofore to minimize the effects of this form of image deformation, commonly referred to as jitter. Normally such detectors are positioned at the start of each scan line at a predetermined distance from the edge of the recording surface. A signal generated by the detector is utilized as a timing, or synchronizing, signal to assure that the modulation of the beam begins in precisely the same vertical plane of the beam relative to the edge of the recording surface.

In most commercially feasible systems, however, such detectors do not totally compensate for jitter introduced by irregularities in the beam deflecting mechanism, such as the lack of reflective or surface flatness uniformity between adjacent facets of the polygonal mirror, rotational asymmetry associated with the polygon drive mechanism, and the like. While it is possible to correct for such unavoidable jitter by manufacturing the polygon and drivers to strict tolerances, such measures are generally cost prohibitive for commercial printers.

The foregoing effects are compounded in the systems which employ a solid state diode laser as the recording beam. As is quite well known, the power output of such lasers varies both spatially and in amplitude over time. Conventional beam detectors do not compensate for these variations and, hence, unavoidably produce jitter when utilized in a diode laser environment. Exemplary of these known detectors are the so called slit detectors, which compare the amplitude of a photodiode output signal against a predetermined, fixed reference voltage. When the amplitude of the diode signal passes through this reference threshold, an indicator signal is generated. With a diode laser scanning system, the intensity distribution pattern of the formed beam is generally gaussian. The signal generated by the detector diode will track, in amplitude, this gaussian shape as the beam sweeps across the face of the detector. The outputs produced by beams having different power levels will, necessarily, pass through the fixed reference level at different relative times, resulting in the generation of indicator signals at different points in time in relation to the time reference base of the sweep of the beam. Since the synchronization of the scanner system is keyed to the time difference between the generation of the indicator signal and the transit time of the beam from the detector location to the targeted edge of the recording medium, this differential triggering effects a translation of information horizontally, or in the scanned direction, from line to line so that the picture elements do not align properly in the cross-scan direction. These effects are present for all fixed reference single edge detectors, whether triggered by the leading or trailing edge of the diode output signal.

A known means for overcoming the problem associated with comparing against a fixed reference, is the so called split detector. Such detectors utilize a two photodiode-dual comparator configuration to compensate for variation in beam output power. In operation, the sweep of the beam over the first detector sets an associated first comparator. The output of this first comparator is supplied as a reference for the second comparator, which is thereafter triggered by the sweep of the beam across the second diode detector to provide the indicator signal. While this form of detector performs quite satisfactorily, there is an attendant cost tradeoff.

SUMMARY OF THE INVENTION

In accordance with the present invention there is provided a means and technique for detecting a scanning beam of radiant energy which enables synchronization of a radiant energy beam scanning system relative to the center of the power distribution within the beam so that there is proper alignment of information recorded on consecutive scan lines. Compensation is provided for variations in both the power level and focus of the beam. The invention is particularly well suited for use as a start of scan detection in a diode laser based recording system.

In a preferred embodiment, a single diode detector, partially masked in a cross-scan direction, is located at a predetermined position in a scan path of the beam. The output signal produced when the diode detector is irradiated by the scanning beam is coupled to an input of an op amp voltage follower. The output of the op amp is filtered and stored as a reference signal on a capacitor. Since the output of the voltage follower is a unity gain, in phase replica of the applied diode output signal, the stored reference signal represents the average total power within the incident beam. This reference signal is divided by a fixed ratio (preferably a division in half) and supplied to the non-inverting input of a comparator. The diode output signal, which is coupled to the non-inverting input, initially sets the comparator low. As the beam crosses the edge of the mask, the detector output signal decreases rapidly towards the zero level, pulling the non-inverting terminal of the comparator with it. When this falling output signal reaches the level of the fixed ratio of the reference signal stored on the capacitor, the comparator switches high, creating the indicator signal. When the division ratio is selected to divide in half the average total power level (as stored on the capacitor associated with the output of the op amp) the generation of the indicator signal coincides with the passage of half the beam power across the edge of the mask. Since half of the detected beam power still remains within the unmasked active diode area, it will be seen that the mask edge provides a reference point along the scan path which marks the center of the beam power distribution coincident with the generation of the indicator signal. For a gaussian-like distribution of beam power, the synchronization of the system relative to this detection of the beam power center enables positioning the maximum "writing" energy where intended on the recording medium. Since the centers of the beam power distribution will likewise be detected in consecutive scans, the respective spatial positions of the beam power centers will also be positioned in the desired locations on the recording medium. Thus, marks intended to be made will, in fact, be made in proper relation to previously recorded marks.

In addition to avoiding the problem of jitter by compensating for variations in beam power level and focus, there is also provided, by virtue of the potential developed and stored on the capacitor, a DC reference signal which is representative of the average total power of the beam. This reference signal is available for feedback control of the beam source. When utilized as a start of scan detector, this signal enables correction of the output power level of the beam source at the beginning of a scan line, before the initiation of recording.

DESCRIPTION OF THE PREFERRED EMBODIMENT

Figure 2:
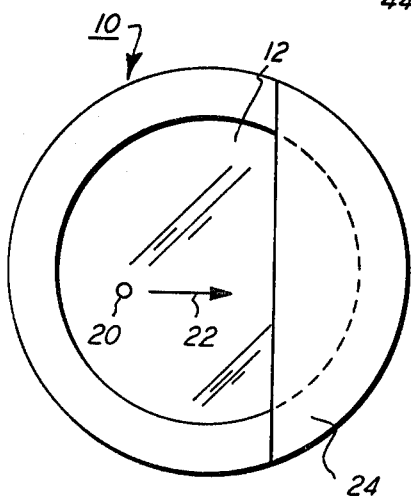
FIG. 2 is a front view of a masked detector diode.

Referring initially to FIG. 2, there is shown a front view of a diode detector 10, across which there is shown a beam spot 20 travelling in the direction of arrow 22. Since the present invention has applicability to any radiant energy beam scanning system, it will be appreciated by those having skill in the art that various means could be employed to effect the transit of beam spot 20 across detector 10. Since the invention functions equally well with an out of focus beam, it is likewise not essential that the beam be formed into a circular, or otherwise symmetrical, spot as shown in FIG. 2. To the contrary, the invention is expressly intended to compensate for such variations in beam spot size, shape, or spatial power distribution. It is only necessary that the active diode area 12 be electrically responsive to the presence of the particular radiant energy beam being utilized. In the diode laser context herein described, it has been found that a pin photodiode functions quite satisfactorily. Although not drawn to scale, FIG. 2 suggests the relative dimensions of an approximately 4.2 mils beam spot traversing a detector active area of approximately 100 mils. It will be seen that an out of focus, or "sloppy", spot will also fully irradiate the active diode area. As will be discussed more fully hereinafter, the power level of the beam is sensed during its traverse of the active area 12, a proportional measure thereof being stored as a reference. After the beam passes the edge of mask 24, the active diode area 12 is no longer irradiated so that the output of detector 10 decreases. While it is preferred that the mask present a sharp edge in the cross-scan direction so that the detector responds sharply, it will be apparent that various other forms of a mask, or, in fact under certain conditions, no mask at all, may be employed consistently with the disclosure herein.

Figure 1:
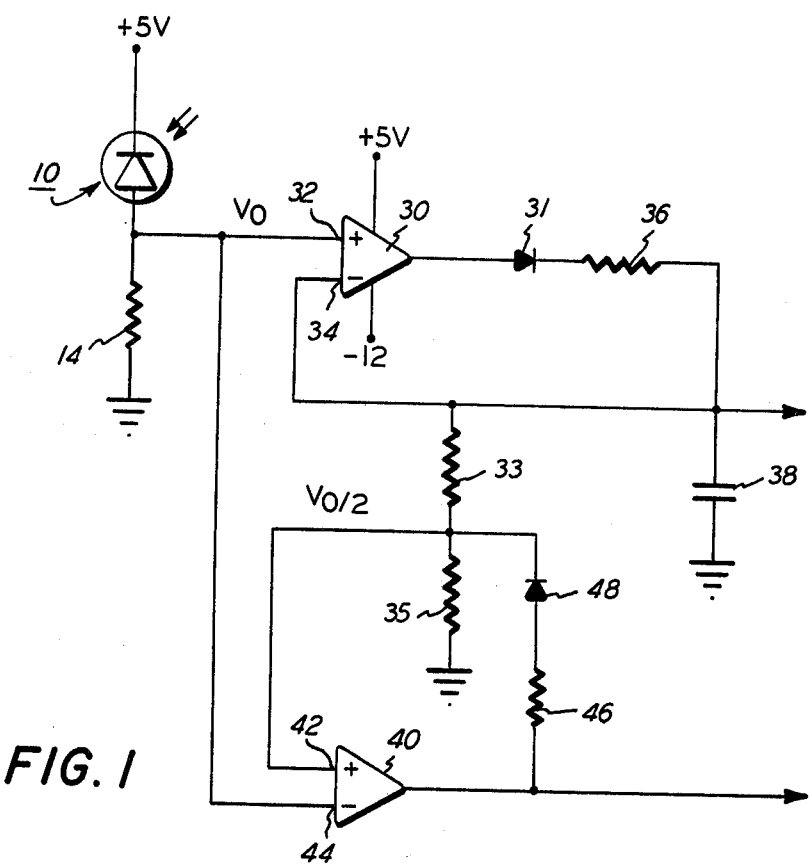
FIG. 1 is an electrical schematic diagram of the preferred detector according to the invention.

In the preferred configuration of FIG. 1, diode detector 10 is reversed biased to operate in a photoconductive mode to provide fast response. Accordingly, it functions to deliver an output current through a load resistor 14 when the beam 20 is incident upon the active diode area 12. The detector output signal, or voltage developed across load resistor 14, will, of course, rise and fall in amplitude in proportion to the power of the beam, since the preferred pin photodiode has a substantially linear response. The output signal so developed is coupled to the non-inverting input terminal 32 of operational amplifier 30. It will be readily apparent that, by virtue of the feedback to the inverting terminal 34, op amp 30 is configured as a voltage follower so that the output thereof is a unity gain, in phase replica of the input voltage, i.e. the voltage developed by diode detector 10 and its load resistor 14 in response to the beam.

The output of op amp 30 is connected to ground through diode 31, resistor 36, and capacitor 38. Resistor 36 and capacitor 38 form a filter which functions to smooth or average, the maximum output of op amp 30 so that there is stored on capacitor 38 a reference signal which represents the average total power of the detected beam. Thus, any variations, or ripples, which are caused by fluctuations in the detected beam power level, will be smoothed out by the RC time constant of the filter, providing an average maximum value which is stored on capacitor 38. Diode 31 is included in the output circuitry of op amp 30 to enable retention of the charge on capacitor 38. Its presence allows capacitor 38 to remain charged while the detector output signal and, hence, the output of op amp 30, go toward zero. Thereafter, diode 31 permits slow decay of the charge on capacitor 38.

The reference voltage stored on capacitor 38 is proportionately divided by the network comprising resistors 33 and 35. The values of resistors 33 and 35 are selected so that a fixed percentage of the reference signal stored on capacitor 38 is supplied as a reference potential to the non-inverting input terminal 42 of comparator 40. Preferably the ratio is selected to deliver 50 percent of the potential stored on capacitor 38. With this selection, a signal representing 50 percent of the average total power of the detected beam is established as the reference for comparator 40. The output of the diode detector is directly coupled to the inverting input terminal 44 for comparison with the representative half power level.

Figure 3:
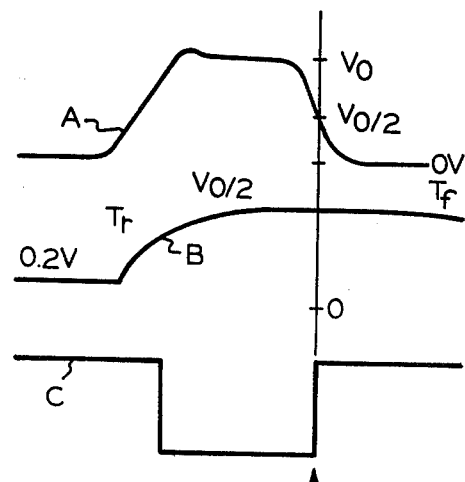
FIG. 3 shows various signals provided by the apparatus of FIG. 1.

Operation of this circuit is more easily understood with reference to the wave forms shown in FIG. 3. For illustrational purposes, the three wave forms are shown superposed in approximate time wise relationship to each other. It will be understood that each of the three curves is drawn relative to a unique amplitude axis, these axes not being shown in relative scale. Wave form A represents the detector output signal developed as beam spot 20 traverses the diode detector 10. As noted above, this signal is supplied to op amp 30 and, as well, to the inverting input 44 of comparator 40. Wave form B illustrates the reference signal supplied to the non-inverting input terminal 42 of comparator 40. This signal, it will be recalled, is derived through division of the potential stored on the capacitor 38. Curve C represents the output wave form of comparator 40 in response to the input signals shown in curves A and B.

When beam spot 20 enters the active diode area 12, detector 10 produces a current which develops an output voltage $V_o$ which rises in accordance with the beam power level as illustrated in curve A of FIG. 3. This transition is sensed by comparator 40, which sets, or switches, low as shown in wave form C. The total beam power is sensed as the beam transits the active diode area 12 producing the initial slight overshoot of wave form A, followed by a generally flat maximum output level. When the beam passes into the masked region, the output falls sharply as indicated in curve A. As shown by wave form B, the potential applied as reference to the non-inverting input terminal 42 of comparator 40 rises to a level representative of the 50 percent power level. Because of the RC time constant of resistor 36 and capacitor 38, once developed, this potential is maintained at a generally even level, against which the diode output is compared by comparator 40. When this detector output falls to a half power level ($V_o/2$), comparator 40 triggers, or goes high, as shown by wave form C this transition provides the indicator signal.

Referring to wave form B, it will be noted that this curve also represents the shape of the voltage developed across capacitor 38. It will be appreciated that the filtered output of the voltage follower op amp 30 will rise and stabilize at an amplitude equal to the average maximum amplitude of the detector output signal. The level thus reached, and consequently stored on the capacitor 38, represents the average total power of the sweeping beam. Since this potential decays slowly relative to the transitions of the detector output signal and the comparator output signal, it is available concurrently with the generation of the indicator signal, i.e. when comparator 40 goes high. As suggested by the arrow adjacent capacitor 38 this measure of the total power level of the beam is available for feedback control of the beam generator.

With the selection of the preferred divide by two ratio for the resistive network, the generated indicator signal enables system synchronization so as to place the center of the power distribution within the beam at the point desired on the recording medium. Since the beam velocity as well as the distance between detector and target area on the record medium are known, this desired placement may be synchronized and provided in a known manner. The divide by two choice is most advantageous for achieving vertical alignment of picture elements in consecutive scans. By triggering always relative to the detection of the center position of the beam power distribution, the maximum available energy available for marking will always be positioned where intended on the recording medium.

Referring again to FIG. 3, curve B is shown as having an initial level of about 0.2 volts. This minimum reference potential for the positive input 42 of comparator 40 is provided to prevent noise from falsely triggering comparator 40. To prevent input 42 from going to ground, positive hysteresis is provided by resistor 46. To eliminate the error which would normally result when using hysteresis in signal detection, diode 48 is provided in the hysteresis loop. When the signal is present, this diode reverse biases, effectively removing resistor 46 from the circuit.

I claim:

1. Apparatus for detecting a scanning beam of radiant energy from a radiant energy source at a predetermined position along a scan path and for providing an indicator signal useful for the establishment of a start of scan position on a recording medium, said apparatus comprising:

(a) a photodiode assembly having a photodiode with a receiving surface and positioned at said predetermined position for detecting said beam and providing an output voltage when the receiving surface is irradiated by said beam;

(b) an operational amplifier having an inverting and a non-inverting input terminal and being configured as a voltage follower, the amplifier having the assembly output voltage coupled to its non-inverting input terminal with a feedback voltage coupled to the inverting input terminal, so that the amplifier output has unity gain and is in phase with said assembly output voltage;

(c) a RC filter for averaging the amplifier output;

(d) a diode being positioned between the amplifier and the RC filter to enable the capacitor in said filter to store the averaged amplifier output as a reference signal, said signal representing the average total power of the detected beam;

(e) a comparator having an inverting and a non-inverting input terminal and an output terminal, the assembly output voltage being coupled to the comparator inverting terminal; and (f) a network circuit having voltage dividing resistors enabling 50 percent of the reference signal stored on said capacitor in the RC filter to be supplied to the comparator non-inverting terminal, so that the assembly output voltage is compared with 50 percent of the reference signal and, when the assembly output voltage decreases to the level of 50 percent of the reference signal, the comparator provides the indicator signal at its output terminal that is representative of the center position of the power distribution within said scanning beam.

2. The apparatus of claim 1, wherein the reference signal from the RC filter capacitor is concurrently available as a measure of the total power level of the scanning beam for feedback control of the radiant energy source.

3. The apparatus of claim 1, wherein a mask is placed over a portion of the receiving surface of the photodiode to provide a sharp edge in the scan direction to increase the rapidity of the assembly response.

4. The apparatus of claim 3, wherein a spot generated by the scanning beam on the receiving surface of the photodiode is approximately 4.2 mils and the said receiving surface is approximately 100 mils.

5. The apparatus of claim 3 wherein the photodiode of assembly is reversed biased to operate in a photoconductive mode, with an output current flowing through a load resistor when the scanning beam is irradiating the unmasked portion of the photodiode receiving surface, so that a faster response is provided by said assembly.

6. The apparatus of claim 5, wherein said photodiode has a substantially linear response.

7. Apparatus for detecting a scanning beam of radiant energy from a radiant energy source, the apparatus being located at a predetermined position along a scan path to provide an indicator signal useful for the establishment of a start of scan position on a recording medium in response to the detection of the beam, said apparatus comprising:

(a) a photodiode means at said predetermined position for providing an output voltage when the photodiode means is irradiated by said scanning beam;

(b) means for amplifying the photodiode means output voltage;

(c) means for filtering and storing the amplified output voltage, so that the amplified output voltage is averaged prior to being stored and represents the average total power of the detected beam;

(d) means for dividing the stored and amplified output voltage by two; and (e) means for comparing the output voltage of the photodiode means with 50 percent of the amplified output voltage provided by said dividing means, the comparing means providing a start of scan indicator signal when the output voltage of the photodiode means decreases to the value of 50 percent of the amplified output voltage, which indicator signal represents the center position of the power distribution within said scanning beam.

8. The apparatus of claim 7, wherein the amplified and stored output voltage from the photodiode means is used as a measure of the total power level of the scanning beam for feedback control of the radiant energy source.

9. The apparatus of claim 7, wherein a mask is included in the photodiode means to provide an edge that sharply blocks the scanning beam from irradiating a portion of the photodiode means which is responsive to radiant energy.

10. The apparatus of claim 9, wherein the cross-sectional area of the scanning beam is smaller than the area of the portion of photodiode means which is responsive to radiant energy by at least a factor of 10.

11. A method for detecting a scanning beam of radiant energy from a radiant energy source and providing an indicator signal useful for the establishment of a start of scan position on a recording medium in response to the detection of the beam at a predetermined position in the beam's scan path, method comprising the steps of:

(a) scanning said beam across a photodetector at said predetermined position;

(b) providing an output signal from the photodetector, said output signal rising and falling in amplitude in proportion to the power of said beam;

(c) amplifying the output signal;

(d) filtering and storing the amplified output signal which represents the average maximum amplitude of the output signal by an RC filter, the capacitor of the filter being used to store the amplified output signal;

(e) dividing the filtered and stored output signal by two;

(f) comparing 50 percent of the filtered and stored output signal with the photodetector output signal; and (g) generating a indicator signal when the photodetector output signal falls to a level corresponding to 50 percent of the filtered and stored output signal, said indicator signal being representative of the center position of the power distribution within said scanning beam instead of the center position of the beam.

12. The method of claim 11, further comprising the step of using the filtered and stored output signal for feedback control of the radiant energy source.

* * * * *